United States Patent [19]
Duwaer

[11] Patent Number: 5,231,381
[45] Date of Patent: Jul. 27, 1993

[54] DATA PROCESSING SYSTEM WITH A TOUCH SCREEN AND A DIGITIZING TABLET, BOTH INTEGRATED IN AN INPUT DEVICE

[75] Inventor: Arne L. Duwaer, Eindhoven, Netherlands

[73] Assignee: U.S. Philips Corp., New York, N.Y.

[21] Appl. No.: 590,985

[22] Filed: Oct. 1, 1990

[30] Foreign Application Priority Data

Oct. 2, 1989 [EP] European Pat. Off. ........ 89202473.8

[51] Int. Cl.$^5$ .............................................. G09G 3/02
[52] U.S. Cl. ................... 340/712; 340/706; 178/18; 178/19
[58] Field of Search ............... 178/18, 19; 340/712, 340/708, 706; 367/907, 129; 341/34

[56] References Cited

U.S. PATENT DOCUMENTS

| 4,564,079 | 1/1986 | Moore et al. | 178/18 |
| 4,645,870 | 2/1987 | Adler | 178/19 |
| 4,686,332 | 8/1987 | Greanias et al. | 178/19 |
| 4,786,896 | 11/1988 | Harte | 340/712 |
| 4,853,496 | 8/1989 | Taniishi | 340/706 |
| 4,916,308 | 4/1990 | Meadows | 340/712 |
| 4,933,544 | 6/1990 | Tamaru | 340/712 |
| 4,977,397 | 12/1990 | Kuo et al. | 178/18 |
| 5,038,142 | 8/1991 | Flowers et al. | 341/34 |
| 4,7775,765 | 10/1988 | Kimura et al. | 178/18 |

FOREIGN PATENT DOCUMENTS

| 0256327 | 2/1988 | European Pat. Off. |  |
| 0297557 | 1/1989 | European Pat. Off. |  |
| 0039232 | 3/1985 | Japan | 340/712 |

Primary Examiner—Ulysses Weldon
Assistant Examiner—Matthew Luu
Attorney, Agent, or Firm—Jack D. Slobod

[57] ABSTRACT

A data processing system includes a multipurpose data input device formed by a touch screen and a digitizing tablet integrated with one another which are activatable independently of each other by proper stimuli. The input device is integrated with a flat panel display in order to establish a visual feedback to the user or to present information pertaining to the entered data after processing. The flat panel display, touch screen and digitizing tablet take a variety of forms and a variety of techniques are utilized to determine which of the touch screen and digitizing tablet is activated at any time.

23 Claims, 5 Drawing Sheets

DATA PROCESSING SYSTEM WITH A TOUCH SCREEN AND A DIGITIZING TABLET, BOTH INTEGRATED IN AN INPUT DEVICE

BACKGROUND OF THE INVENTION

1. Field of the Invention

The invention relates to a data processing system including an input device with a touch screen for inputting data into the system by means of touch, and a digitizing tablet for inputting data into the system by means of manipulation of a stylus near a tablet area, wherein the touch screen area and the tablet area are at least partly overlapping.

2. Description of the Related Art

Systems employing a touch screen as a data input device are widely known. By touching the touch screen at a predetermined position with a finger, or with an object having a similar operation with respect to the touch screen, data are selected that are indicative of that particular position. Thereupon the associated data are introduced into the system and are processed. A touch screen may be combined with a display for selecting data according to the zones shown on the display, such as virtual buttons. Also, the display may function as a means for providing visual feedback to the user by showing the information pertaining to the data after processing. On the basis of the mechanism for activating the touch screen several types of touch screens can be distinguished. Touch screens of a first type are those that require for activation an actual contact between the finger of the user or another object and the screen. An example of such a touch screen employs the localization of the absorption of surface acoustic waves propagating in a front-panel, the absorption occurring as consequence of the contact between the panel and a soft tissue such as the user's finger. Another example of a touch screen of the first type is a screen wherein the reaction-forces and reaction-moments, occurring in the suspension of the screen when it is touched, are registered for deriving the location of the contact.

For touch screens of a second type the presence of an object, such as the user's finger, in the proximity of the screen is sufficient for enabling the activation of the touch screen without an actual contact. An example of such a touch screen uses a grid of light beams (infrared) in front of and parallel to a front-panel. The presence of an object at a particular location in the grid is detected upon the blocking of lightbeams associated with that particular position. In another example of a touch screen of the second type the user's finger in the proximity of the touch screen establishes a capacitive coupling towards ground, which coupling can be detected and localized.

Therefore, the term "touch" in this text will incorporate: "manipulating an object in the detection range of", in addition to: "establishing an actual contact with".

It is a disadvantage of the conventional systems that these are not suitable for both a data-input by means of touching the touch screen at predetermined zones, like virtual buttons, with a finger or a similar object suitable for pointing, and a data-input by means of writing, drawing or accurate pointing on the screen with a suitable stylus. In other words, the touch screens of the known systems cannot represent a virtual control panel with buttons, or a keyboard as well as a digitizing tablet.

Writing or drawing in an ergonomically justified way implies that the writer's or drawer's hand is supported by a surface more or less coinciding with the area to be written upon. The known touch screens requiring an actual contact for activation will register simultaneously the contact of the stylus with the screen and the contact of the writer's hand with the screen without discriminating between the two impressions. The known touch screens that are activatable by manipulating an object, like the user's finger, in front of the screen cannot discriminate between the stylus and the user's hand either. For example, both the hand and the stylus intercept the light beams of the grid that couples a plurality of light transmitters with a plurality of associated light detectors, or both enable a capacitive coupling towards ground.

Also the touch screen and the digitizing tablet operate with mutually different resolutions on stimuli, since the accuracy of a touch depends on the dimensions of a finger (order of magnitude: 1 cm) and the accuracy of a data entry with a stylus depends on the dimensions of the cooperative part of the stylus (order: 1 mm or even smaller).

SUMMARY OF THE INVENTION

It is therefore an object of the invention to provide a data processing system with a compact data input device enabling the entering of data into the system by touching the touch screen with a finger or the like as well as by writing, drawing or accurate pointing on the screen by means of an appropriate stylus as desired.

A data processing system according to the invention is therefore characterized in that the touch screen comprises a first sensing means for converting a first stimulus representative of a touch presence and location into a first signal for the data handling means, and that the digitizing tablet comprises a second sensing means for converting a second stimulus representative of a presence and location of the stylys into a second signal, the first and second sensors being physically distinct and their output signals being fed out in parallel.

Physically distinct sensing means, that is, two separate conversion mechanisms, where components involved in converting a stimulus into a signal are allocated to either the first or the second sensor, have the advantage that they are easier to manufacture, because the two distinct sensing devices can be manufactured separately and added successively to the system. It is also convenient in use, because the output signals can be fed out in parallel leaving the data handling means the option to handle the outputs in parallel or one by one. Thus, the two sensing means will not interfere with one another and do not need to contend for shared sensing means, which allows for simplicity and flexibility in the design of application programs utilizing such a combined touch screen and tablet.

A compact input device is realized by integrating a touch screen and a digitizing tablet with one another. As both are activatable independently of one another, the touch screen will only respond to a touch and the digitizing tablet will only respond to the stylus. The touch screen and the digitizing tablet are integrated on the organizing level, that is employing a data handling means that is common to both. The data handling means handles the data originating in the touch screen as well as the data originating in the digitizing tablet.

Several types of separate digitizing tablets are known. In a first example, the stylus radiates ultrasonic waves. For instance by means of at least two receivers a cross-bearing then indicates the momentary position of the stylus. In a second example, the stylus emits electromagnetic waves that induce currents in two sets of oblong conductors that lie in mutually different orientations in two parallel planes. The inductive currents in the pair of crossing conductors that overlap the area of the momentary position of the stylus are detected for localization of the stylus. In a third example, the digitizing tablet comprises a conductive sheet that conducts alternating currents in such a way, that the phase or amplitude of the resulting electromagnetic field, measured at a predetermined location of the sheet, is indicative of said location. Via a capacitive coupling the stylus detects the associated electromagnetic field exhibiting the particular phase or amplitude. The information contained by the phase or amplitude can then be transmitted to the system and thereupon be processed as an indication of the stylus' momentary position. In a fifth example the digitizing tablet comprises a resistive sheet wherein the radiating stylus induces currents. By measuring the aggregated currents in two anti-parallel directions a quantity can be derived indicative of the aggregated resistance that the currents have overcome. The ratio of the resistances that correspond to the aggregated currents in two anti-parallel directions is associated with the ratio of distances the currents have had to travel through the sheet. By deriving these ratios for two mutually independent directions the area can be located at which the currents originated, that is the area in the nearest proximity of the radiating stylus.

At this point it will be clear for the man skilled in the art that a plurality of combinations of touch screen and digitizing tablet both integrated within the same compact input device will be possible, dependent on the screen's and the tablet's activation mechanisms or accessability in view of their position relative to each other.

Several combinations are possible. The touch screen and the digitizing table can be integrated contiguously within substantially the same area of the front panel of the input device. This set up enables a cooperation between the touch screen and the digitizing tablet, the touch screen functioning for example as an input device for selecting a particular operating mode by means of soft keys of the digitizing tablet as a data-receiver. The touch screen and the digitizing tablet need not be coplanar. For instance, the touch screen part may be integrated in a raised border of the input device under a substantial angle with the plane digitizing tablet for ergonomic reasons. Also the touch screen and the digitizing tablet may occupy areas of substantially different proportions. In another embodiment the touch screen and the digitizing tablet are stacked permitting the input device to have limited dimensions. Again, the touch screen and the digitizing tablet may occupy areas of substantially different proportions. Preferably, a selection means, like a toggle switch, is provided for alternatingly turning on or off either part of the input device in order to prevent an unintentional data entry form occurring, for example from a hand resting on the input surface while it manipulates the stylys. As an alternative, such an undesired touch signal can be avoided by using a data processing system comprising touch disabling means for disabling touch location sensing in response to stylus presence detection.

Preferably, the structure containing the touch screen and the digitizing tablet itself is integrated with a display for the visual feedback towards the user. In view of the dimensions of this laminated composition the display preferably is of the so-called flat panel type.

Within the technical field of the flat panel displays, one can differentiate between self-emitting (or active) panels and non-self-emitting (or passive) panels. An example of an active panel is a thin film electro-luminescent display (ELD). Such a display comprises a matrix of capacitors, each whereof has a dielectric layer between two electrodes. With a sufficiently high, alternating electrical field across the dielectric layer, containing for instance ZnS and Mn, hole-electron pairs will be generated that will cause the radiation upon recombination.

Another example of an active flat panel display is a plasma display panel (PDP) based on localized vapour discharge.

An example of a passive flat panel display is a liquid crystal display (LCD). In a LCD the polarization of light by liquid crystals can be varied under control of an electric field, giving rise to the modulation of the amount of light transmitted when appropriate polarizers are used. In view of the relatively low power dissipation and of the relatively low cost price, the LCD prevails over the other types. LCD's suitable for integration with the touch screen and the digitizing tablet may be the Twisted Nematic LCD's, with an active matrix with a switching element (e.g. a transistor or a diode-ring) for each pixel, the Super Twisted Nematic LCD's without an active matrix, or a Ferro-Electric LCD comprising a memory inherent in the display itself.

Preferably, the data processing system according to the invention comprises mouse means coupled to the input device in order to enable all current ways of data entry. For instance, the "mouse" is operated via the touch screen by indirect pointing, that is by touching with a finger a particular sector of a segmented compass-card that is shown on the touch screen resulting in relative displacements of the cursor, or via the digitizing tablet by direct pointing and cursor-control for dragging. Thus, the invention provides a data processing system that is compact, portable, and multi-functional with respect to data entry. Also, within this context reference is made to Dutch Patent Application 8901805 of the same Applicant wherein means are disclosed for converting a touch screen into a keyboard which permits professionaly high data-entry speed by way of a tactile feedback towards the user.

Preferably, in case at least the touch screen or the digitizing tablet is activatable in an electrical way, the input device comprises a conductive sheet at a fixed potential for protecting the touch screen or the digitizing tablet against electromagnetic radiation originating in the control circuitry of the data processing system, for instance due to the control of the display. In a stacked embodiment there may be provided a transparent conductive layer between the digitizing table and the touch screen on the one hand and the radiating circuitry part of the display on the other hand.

As has been stated previously, it will be clear to the man skilled in the art what kind of touch screen digitizing tablet and, display can be integrated within a single panel. The usefulness of a particular combination will depend among others on the activation mechanisms of the touch screen and of the digitizing tablet, the possibility of realizing transparent embodiments of said latter parts, and the insusceptibility of the various parts constituting the panel to each other's operation.

BRIEF DESCRIPTION OF THE DRAWING

Various embodiments of an input device comprising particular combinations of a touch screen, a digitizing tablet and a flat panel display for use in a data processing system according to the invention will be illustrated by way of non-limitative examples with reference to drawing, wherein.

DETAILED DESCRIPTION OF THE PREFERRED EMBODIMENTS

Figure 7:
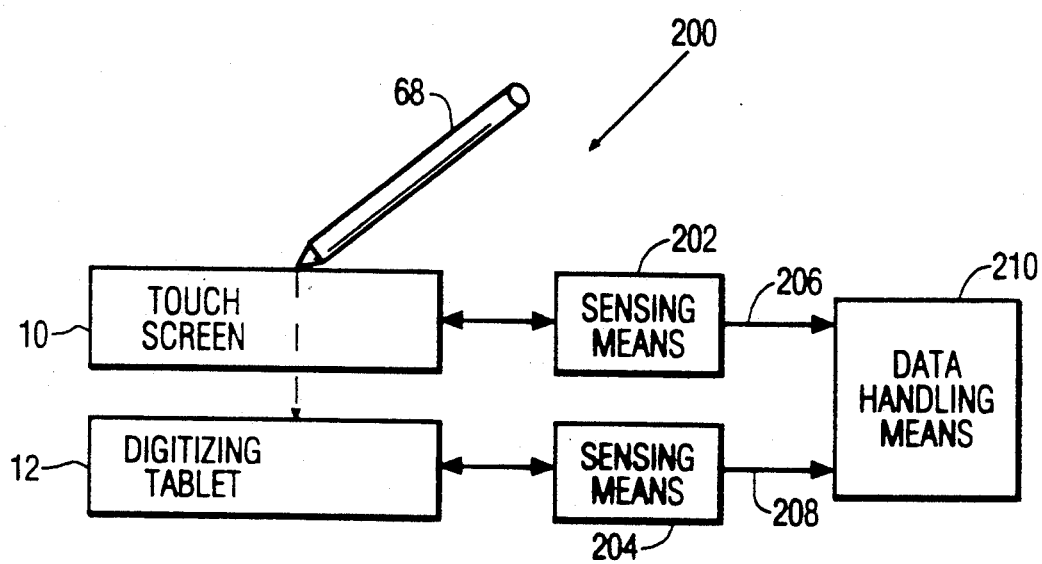
FIG. 7 is a generalized schematic diagram of a data processing system in accordance with the invention.

Referring first to FIG. 7, the data processing system 200 of the present invention is seen to generally comprise a touch screen 10 for receiving a touch as by a user's finger 34, a digitizing tablet for interacting with a stylus 68 proximate thereto, first sensing means 202 for sensing the presence and location of the touch within the area of touch screen 10, and second sensing means for sensing the presence of stylus 68 above digitizing tablet 68 and its location within the tablet's area. The first and second sensing means generate respective signals 206, 208 and feed them in parallel to data handling means 210.

Throughout the Figures same reference numerals with designate identical or corresponding parts.

Figure 1:
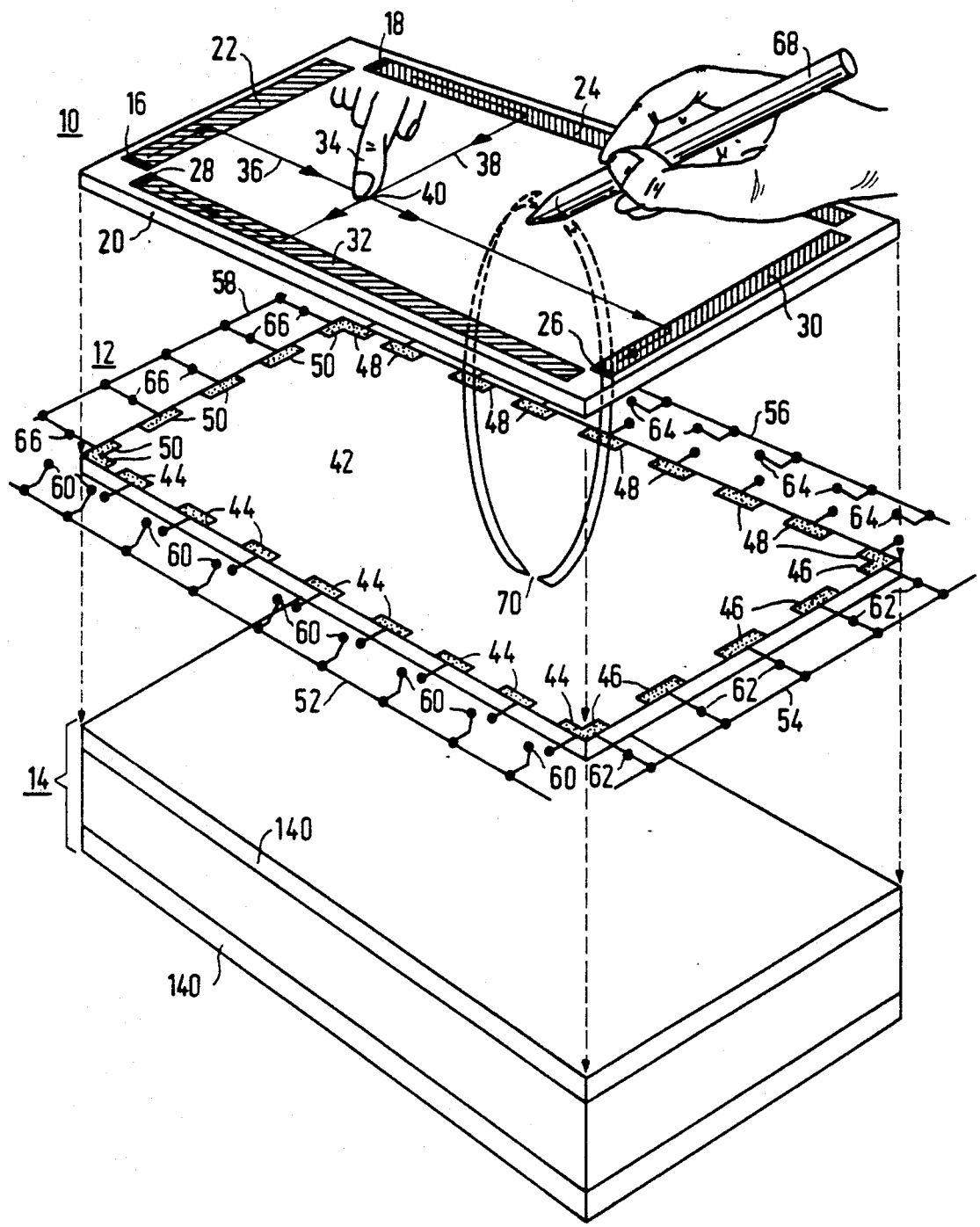
FIG. 1 is an exploded isometric view of a first diagrammatic example of an input device containing as integral parts thereof: a touch screen based on the use of surface acoustic waves, a digitizing tablet based on a capacitive coupling between the tablet and an appropriate stylus, and a LCD, as a display.

In FIG. 1 there is shown a first diagrammatic example of an input device for use in a data processing system according to the invention. The input device comprises a layered structure with the touch screen 10 at the top, the digitizing tablet 12 in the middle and a liquid crystal display (LCD) 14 at the bottom. For clarity the components constituting the layered structure have been drawn spaced out. In practice, the structure is a compact laminated device. The touch screen 10 operates on the basis of surface acoustic waves (SAW), radiated by transmitters 16 and 18 into the front panel 20 along respective series of reflective elements 22 and 24 in order to spread the transmitted waves across the panel 20. The panel is further provided with receivers 26 and 28 that receive the waves after they have been reflected by respective other series of reflective elements 30 and 32. A SAW-pulse transmitted by transmitters 16 or 18 will be received retarded and broadened by receivers 26 or 28. In case a soft tissue, like the user's finger 34, contacts the panel 20, some of the energy of the SAW-pulse will be absorbed by the tissue, resulting in a decreased amplitude of the pulse components 36 and 38 passing through the location of contact 40. The moment of the receipt of said reduced components, related to the moment of transmission, is indicative of the momentary position 40 at which the absorption occurs. In order to avoid mutual interference, transmitters 16 and 18 may alternate transmission.

The digitizing tablet 12 is situated below touch screen 10. The tablet 12 comprises an electrically resistive homogeneous sheet 42 of a transparant, electrically conductive substance, for instance Indium-Tin-oxide. Along its circumference sheet 42 is provided with a plurality of series of highly conductive, uniformly distributed electrodes 44, 46, 48 and 50 for establishing electrical contacts with the resistive sheet 42. Each series of electrodes is connectable to or disconnectable from an associated conductor 52, 54, 56 and 58, by means of an associated series of switches 60, 62, 64 and 66. The switches 60 and 64 are operated simultaneously. Also the switches 62 and 66 are operated simultaneously. The pairs of switches 60/64 and 62/66 are connected alternately with their associated conductors 52/56 and 54/58, respectively. This basic arrangement may be used in various ways.

In a first appliance the stylus 68 may comprise a source for generating electromagnetic radiation that couples capacitively with sheet 42 and an area 70 through panel 20 for thereupon inducing currents in sheet 42. These currents will spread over sheet 42 and will be gathered by conductors 52/56 or 54/58 at zero potential, that have been connected to sheet 42. Now, the current in each conductor is indicative of the aggregated resistance between area 70 and the relevant conductor. Since the sheet is homogeneous, this aggregated resistance is a quantity that corresponds with a respective distance between an area 70 and the respective conductor. Therefore, by sensing the aggregated currents in both pairs of conductors connected to sheet 42 the area 70 can be accorded coordinates that correspond to the stylus' 68 momentarily position. For sensing the aggregated currents each conductor that is connected to sheet 42 is coupled with a detector (not shown) which may contain: a current-to-voltage converter operating at zero potential ("virtual ground"), an amplifier, an ac-to-dc converter, an analog-to-digital converter and a microcontroller with appropriate software for calculating the coordinates and for possibly adjusting for any deviation between calculated coordinates and physical position of the stylus 68 due to the particular embodiment of the shown input device.

In a second appliance a time-varying electromagnetic field is established across sheet 42 which field has a local phase that is indicative of a position within the field. To this end conductors 54 and 58 may supply synchronously varying simple harmonic voltages to sheet 42, which voltages have a predetermined mutual phase difference, like for instance a sine and a cosine time-dependence. By first sensing the phase by a probe (not shown) in stylus 68 while conductors 54 and 58 are active, and then sensing the phase by the probe in stylus 68 when conductors 52 and 56 carry the time-dependent voltages, the location of the stylus can be derived from the registered phases.

The digitizing tablet 12 is disposed on top of a flat panel display 14 of the LCD type. As both the touch screen 10 and the digitizing tablet 12 are transparent the display 14 can be viewed through these devices, for instance in order to provide visual feedback to the user while writing or drafting with stylus 68 within the range of digitizing tablet 12 or in order to select data to be processed on the basis of information shown on LCD 14 by touching touch screen 10 at a predetermined position associated with said data.

As has been stated above the figure presents an exploded view of a data input device for use in a data processing system according to the invention. The layered structure may in practice be realized as a very compact device, for instance by using the upper surface of a same panel 20 for depositing a pattern thereupon constituting the reflective elements 22, 23, 38 and 32, and by using the downfacing surface for depositing thereupon a layer of resistive material constituting sheet 42 preferably of Indium-Tin-oxide for its transparency. In another embodiment the features constituting the reflective elements 22, 24, 30 and 32 and the sheet 42 may be integrated within one of the polarizers 140 of a LCD, the reflective elements at the one surface for accessability, the resistive sheet 42 at the other surface of the respective polarizer. In a further embodiment the digitizing tablet 12 and the touch screen 10 each may comprise a separate associated panel like panel 20 in view of convenient manufacturing said devices.

Since both the touch screen 10 and the digitizing table 12 utilize different activation mechanisms, (the touch screen 10 is activated mechanically, the digitizing tablet 12 is activated electrically) the input data transferred into the data processing system via the input device shown in FIG. 1 are distinguishable. In order to feed input data selectively into the data processing system, the system may be provided with a selection-switch to enable either the touch screen 10 or the digitizing tablet 12. In the alternative, stylus 68 may incorporate either a (piezo-ceramic) pressure sensor with appropriate processing or simply a pressure-sensitive switch for turning-off the touch screen 10 and turning on the digitizing tablet 12 upon contacting the surface of the input device.

Figure 2:
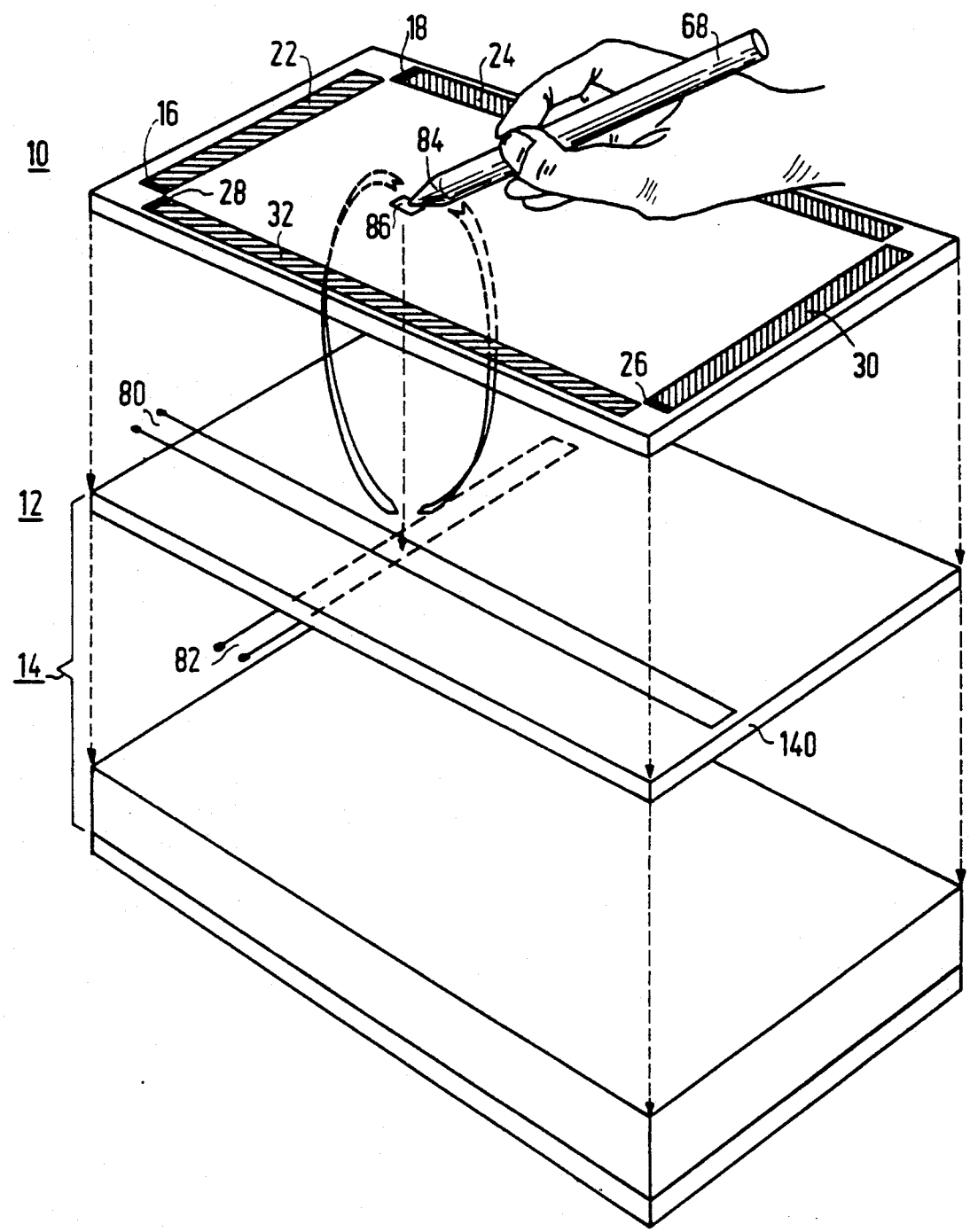
FIG. 2 is an exploded isometric view of a second diagrammatic example containing a touch screen and a display as in FIG. 1 and using a digitizing tablet based on an inductive coupling between the tablet and an appropriate stylus.

In FIG. 2 a second example is shown of a disassembled input device for use in a data processing system according to the invention. The example in this FIG. 2 discloses the LCD 14 to have a polarizer 140 forming an isolating panel as a part of the digitizing tablet 12. The digitizing tablet comprises two sets of oblong conductive loops that lie in a mutually perpendicular orientation in two parallel planes separated by an electrically isolating polarizer 140. For clarity only two crossing loops 80 and 82 have been drawn. By manipulating a stylus 68 having a tip 84 that radiates electromagnetic waves inductive currents occur in the loops 80 and 82 that overlap the projection onto the digitizing tablet 12 of an area 86 at the surface of the input device, in which area 86 the stylus tip 84 is maintained.

By sensing those inductive currents the momentary location of the stylus' tip 84 is determined. Preferably the stylus is provided with a pressure sensitive switch at tip 84 for radiating only when contacting the surface of the input device upon sensing a pressure exceeding a predetermined threshold. Preferably, the conductive loops are made of a transparent material, for instance Indium-Tin-Oxide. As in FIG. 1 input data are discriminated on the basis of the different physical characters of the stimuli, the touch screen 10 being susceptible to mechanically draining the energy of the surface acoustic waves, the digitizing tablet being activated electrically by inducing currents in sets of crossing loops.

Figure 3:
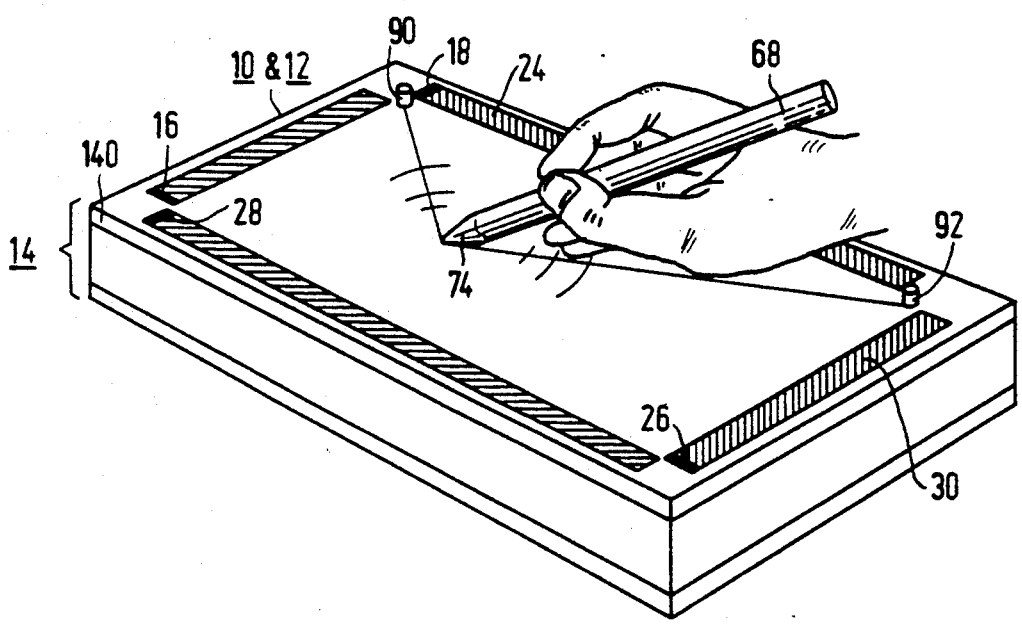
FIG. 3 is an isometric view of a third diagrammatic example using a touch screen and a display as in FIG. 1 and comprising a digitizing tablet based on localizing the position of an appropriate stylus by a cross-bearing of ultrasonic waves.

In FIG. 3 a third example is shown of an input device for use in a data processing system according to the invention. The digitizing tablet 12 and the touch screen 10 now both have been integrated on one of the polarizers 140 of LCD 14. The touch screen 10 is of the surface-acoustic-wave type already described with reference to FIG. 1. At the same surface the digitizing tablet 12 is realized, the operation thereof being based upon ultrasonic waves propagating across the polarizer in the air. The surface is provided with two ultrasonic receivers 90 and 92 for determining the position of a source of ultrasonic pulses at the tip 74 of stylus 68, for instance by means of cross-bearing. Preferably, more than two ultrasonic receivers are employed in order to ensure that position decoding is always possible in spite of the presence of the user's hand that may obstruct the ultrasonic waves.

Figure 4:
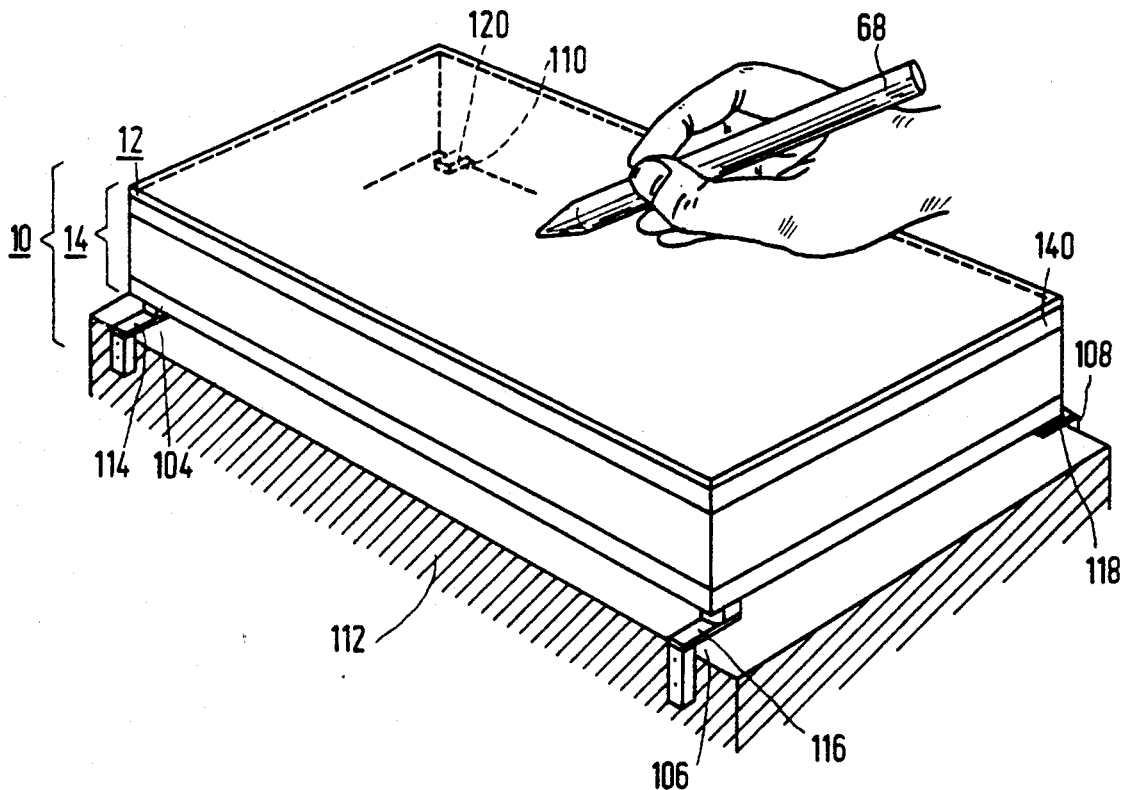
FIG. 4 is an isometric view of a fourth diagrammatic example employing a touch screen, that registers the forces and movements in the suspension of the screen for determining a place of contact, and a digitizing tablet integrated on a surface of a LCD, the tablet's operation being based on ultrasonic-wave-cross-bearing.

FIG. 4 discloses an input device wherein the operation of the touch screen part 10 employs the registering of the reaction forces and -moments in the suspension of the device and wherein the digitizing tablet 12 uses the capacitive coupling between the tablet and a special stylus as has been described previously with reference to FIG. 1. The touch screen part is established by suspending the LCD 14 by four elastic devices 104, 106, 108 and 110, that are attached to a rigid frame 112. Each elastic device comprises a strain gauge, for instance a piezo resistive strain gauge printed on an aluminum substrate, like gauges 114, 116, 118 and 120. Each gauge incorporates several resistances that, for example, are connected in Wheatstone bridge configurations (not shown) in order to derive from the various reaction-forces and -movements in the suspension, occurring when an external force is applied to the upper surface of the input device, the location whereto the external force is applied.

Filter means may be provided for filtering out reaction forces and moments, that are due to the input device's inertia when it is moved and therefore bear no relation with any intended activation. For instance, the filter means may be realized in software for discriminating signals that have predetermined characteristics representing an intended activation by touching the input device with a finger or a stylus in a specified, ergonomical way.

Figure 5:
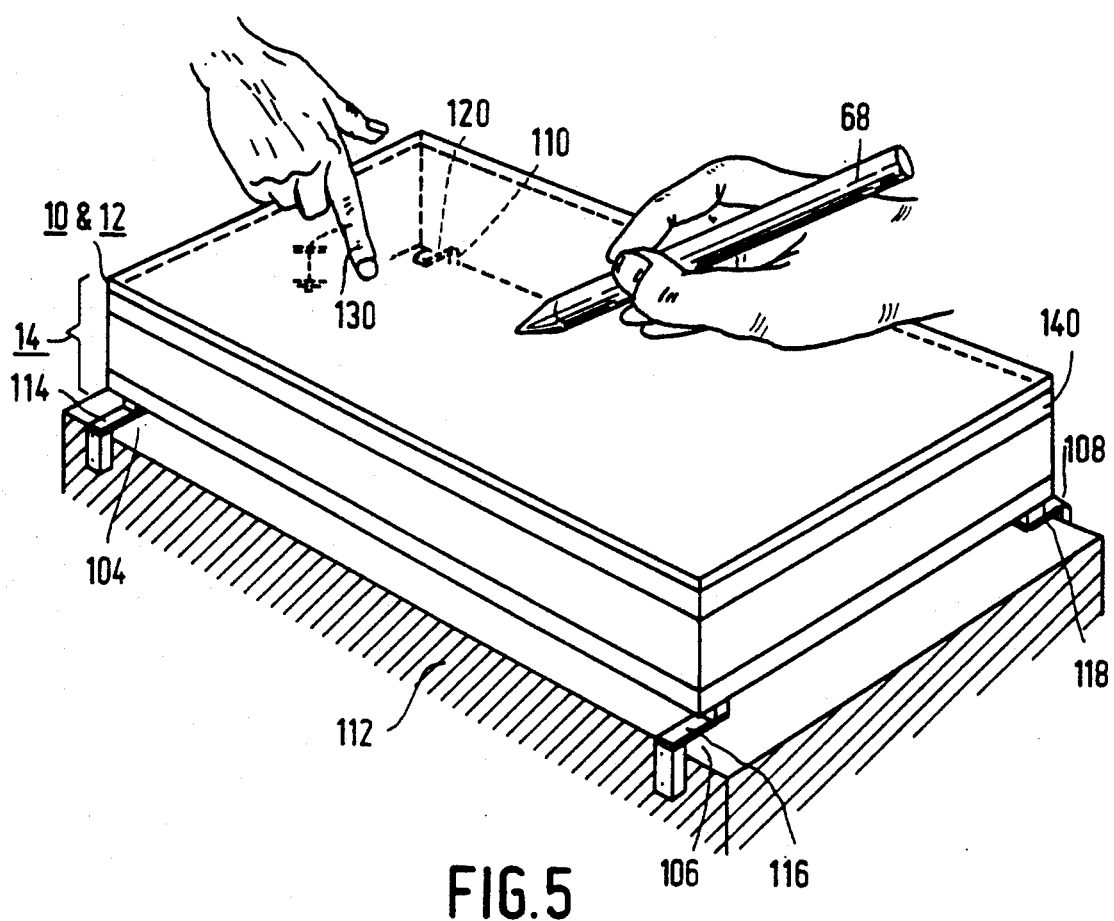
FIG. 5 is an isometric view of a fifth diagrammatic example of an input device employing a touch screen and a digitizing tablet, both based on a capacitive coupling with the input device, while using a force-threshold for determining the activation of the touch screen.

The use of the gauges may be restricted to measure the force in order to compare it with a threshold for ergonomic reasons. This will be clarified by way of FIG. 5, which is similar to the previous FIG. 4 to a large extent. Now, the homogeneous electrically resistive sheet 10 and 12 plays a part in both the digitizing tablet 12 and the touch screen 10. In order to function as a touch screen for being activated by the proximity of finger 130 appropriate electronic circuitry (not shown) is provided for detecting a capacitive coupling from sheet 10 and 12 towards earth via finger 130 and for thereupon deriving the finger's 130 position. This item is well known in the art. In order to function as a digitizing tablet cooperating with stylus 68 other appropriate electronic circuitry (not shown) is incorporated for determining the stylus' 68 momentary position in the way as has already been described with reference to FIG. 1. In this particular embodiment the stimuli that represent the finger's 130 touch or the presence of stylus 68 for activating the touch screen part or the digitizing table part, respectively, are of a same physical character (a signal detected capacitively).

The aggregated force measured by the gauges 114, 116, 118 and 120 is compared with a threshold by a comparator (not shown) for determining when the touch screen should be activated. Preferably, the threshold corresponds with a force of 60-80 gram associated with the pressing of a key in a conventional alfanumerical keyboard of a typewriter. Only when the applied force exceeds the predetermined threshold the touch screen will be activated. Therefore, the use of gauges makes an adjustment of the touch screen part possible with respect to the required force to be applied for activating the touch screen.

Within this context it should be mentioned that the use of gauges as a touch-force thresholding means may be of particular advantage for ergonomic reasons in respect of a tactile feedback when employing a touch screen of the kind, that does not require an actual contact for activation, for instance the capacitive touch screen discussed above and the touch screen based on obstructing light beams that form a grid in front of a front panel.

In all examples given thus far, the digitizing tablet part had to be transparent because of its location in front of the display. An example wherein the transparancy of the tablet is irrelevant is shown in FIG. 6.

Figure 6:
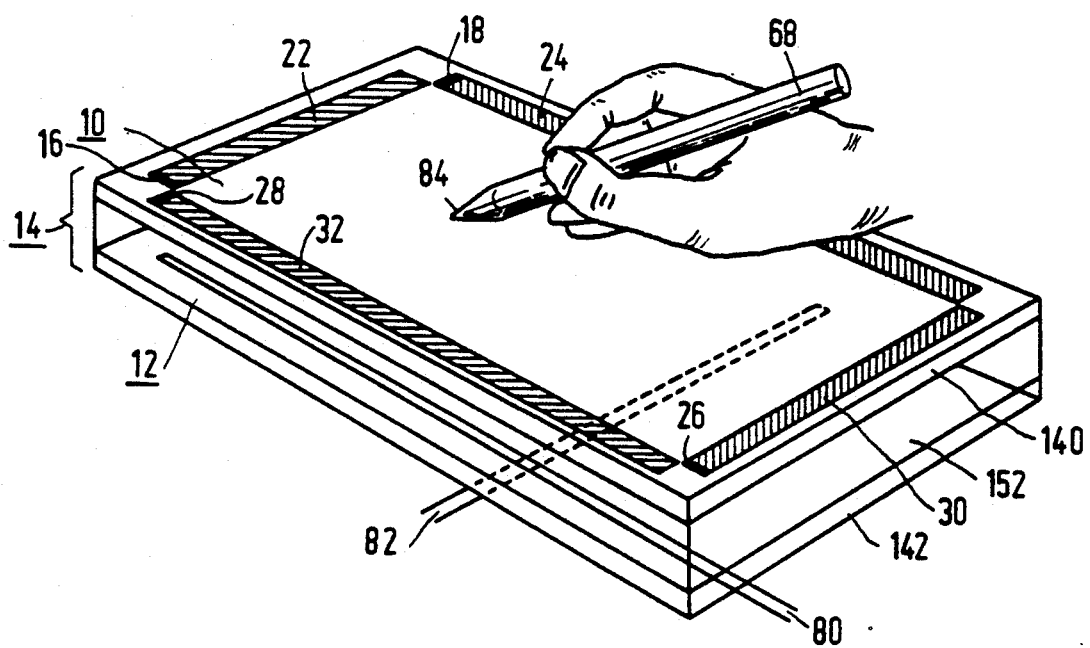
FIG. 6 is an isometric view of a sixth diagrammatic example of an input device wherein the display is sandwiched between the touch screen and the digitizing tablet.

In FIG. 6 an input device according to the invention is disclosed that is comparable with the one presented in FIG. 2 except for the mutual relative positions of the various parts and the compactness of the device. The touch screen part 10 is integrated on the upper surface of polarizer 140 of LCD 14 as has been described with reference to FIG. 3. The digitizing tablet part 12 has been realized with non-transparent conductors 80, 82 on a non-transparent sheet 152. This structure can be employed when the display 14 is passive (requiring no additional back-lighting), reflective and (preferably) thin. The loops 80 and 82 now can be made of for instance Cu or Ag. The specific conductivity of these materials is higher than that of Indium-Tin-Oxide and consequently gives rise to a higher sensitivity and accuracy of the digitizing tablet.

I claim:

1. Data processing system comprising an input device with a touch screen for inputting data into the system by activating an operative touch screen area thereof by a first stimulus comprising a presence and location of a touch, the input device also comprising a digitizing tablet for unpitying data into the system by activating the tablet by a second stimulus comprising a presence and location of a stylus near an operative tablet area thereof, the touch screen area and the tablet area at least partially overlapping, the touch screen and the digitizing tablet being coupled to a data handling means for processing the data, wherein the touch screen comprises a first sensing means for converting said first stimulus into a first signal feeding the data handling means, said first sensing means comprising all components of said input device involved in converting said first stimulus into said first signal, and wherein the digitizing tablet comprises a second sensing means for converting said second stimulus into a second signal feeding the data handling means in parallel with said first signal, said second sensing means comprising all components of said input device involved in converting said second stimulus into said second signal, the first and second sensing means being physically distinct from each other by sharing no component of said input device involved in converting the respective first and second stimuli to the respective first and second signals.

2. Data processing system as claimed in claim 1, wherein the touch screen and the digitizing tablet are stacked in the input device.

3. Data processing system as claimed in claim 1, wherein at least the touch screen or the digitizing tablet can be disabled by means of a switch.

4. Data processing system as claimed in claim 1, comprising touch disabling means for disabling touch location sensing in response to stylus presence detection.

5. Data processing system as claimed in claim 1, wherein the touch screen and the digitizing tablet are integrated with a data display means.

6. Data processing system as claimed in claim 5, wherein the data display means comprises a liquid crystal display, a polarizer whereof being integrated with at least the touch screen or the digitizing tablet.

7. Data processing system as claimed in claim 1, wherein the touch screen comprises:
   a surface being provided with source means for transmitting surface accoustic waves across the surface and being provided with receiver means for receiving the surface accoustic waves;
   a processing means coupled to the receiver means for on the basis of an absorption of the surface accoustic waves at the surface determining a location of the absorption.

8. Data processing system as claimed in claim 1, wherein the touch screen comprises:
   a resistive layer;
   means for determining a location of a capacitive coupling between the resistive layer and earth via the user.

9. Data processing system as claimed in claim 1, wherein the touch screen comprises:
   a rigid surface coupled to a rigid frame by means of stress or strain sensitive elements;
   means for upon monitoring the stress or strain in the elements determining if and where an external force is applied to the rigid surface.

10. Data processing system as claimed in claim 9, wherein filter means are provided for discriminating the stress or strain that is due to the intended activation of the input device by the user as contrasted with the stress or strain due to the input device's inertia when it is moved.

11. Data processing system as claimed in claim 1, wherein the touch screen comprises:
    grid means for generating a grid of light beams in front of and in parallel to a front panel of the input device;
    detection means for upon detecting an obstruction of at least one light beam processing data associated with the particular beam as an indication of a position of the obstruction relative to the input device.

12. Data processing system as claimed in claim 1, wherein the digitizing tablet comprises: means for determining a location of the stylus with respect to the input device by means of an ultrasonic coupling between the digitizing tablet and the stylus.

13. Data processing system as claimed in claim 1, wherein the digitizing tablet comprises:
   a resistive layer;
   means for establishing a time-dependent electromagnetic field across the resistive layer which electromagnetic field has a phase or amplitude that is dependent on a position in the field, the stylus being provided with a detector sensitive to the electromagnetic field;
   processing means coupled to said detector for upon sensing the electromagnetic field determining a location of the stylus with respect to the input device.

14. Data processing system as claimed in claim 1, wherein the digitizing tablet comprises:
   a resistive layer, the stylus being provided with source means for inducing currents in the resistive layer;
   sensing means for sensing aggregated currents flowing in two antiparallel directions across the resistive layer;
   processing means coupled with the sensing means or upon sensing the aggregated currents determining a location of the stylus with respect to the input device.

15. Data processing system as claimed in claim 1, wherein the digitizing tablet comprises:
   a first layer comprising a first set of conductive conductors in a first orientation;
   a second layer parallel to the first layer, comprising a second set of conductive conductors in a second orientation electrically isolated from the first set, the stylus being provided with source means for generating inductive currents in said sets of conductors;
   sensing means for sensing the inductive currents;
   processing means coupled to said sensing means for sensing the inductive currents determining a location of the stylus with respect to the input device.

16. Data processing system as claimed in claim 15, wherein the touch screen and the digitizing tablet are integrated with a data display means comprising a liquid crystal display, a polarizer thereof being disposed between the first and the second layer.

17. Data processing system as claimed in claim 13, wherein the touch screen and the digitizing tablet are integrated with a data display means comprising a passive, reflective liquid crystal display, the digitizing tablet being disposed underneath an active portion of the liquid crystal display.

18. Data processing system as claimed in claim 1, the input device being suspended by means of stress or strain sensitive elements for detecting an external force applied to the input device, comparator means being provided for comparing the applied force with a predetermined threshold, for in case of exceeding the threshold activating the input device.

19. Data processing system as claimed in claim 1, wherein the stylus incorporates a pressure sensor for enabling a cooperation between the stylus and the input device upon the sensor sensing a pressure exceeding a predetermined threshold.

20. Data processing system as claimed in claim 1, wherein at least the touch screen or the digitizing tablet is electrically activatable, there being provided a conductive sheet at a predetermined potential for protecting the touch screen or the digitizing tablet against electromagnetic radiation originating in control circuitry of the data processing system.

21. Data processing system as claimed in claim 5, characterized in that the data processing system is provided with mouse means for displaying a cursor to be operated via at least the touch screen or the digitizing tablet either by pointing to and pressing on a relevant location for repositioning the cursor or by pointing to a segmented compass-card with virtual "click"-buttons, a segment of the compass-card being indicative of a direction of movement of the cursor upon activation of the segment.

22. Data processing system as claimed in claim 2, wherein the touch screen and the digitizing tablet are integrated with a data display means.

23. Data processing system as claimed in claim 22, wherein the data display means comprises a liquid crystal display, a polarizer whereof being integrated with at least the touch screen or the digitizing tablet.

* * * * *